Figure 1:
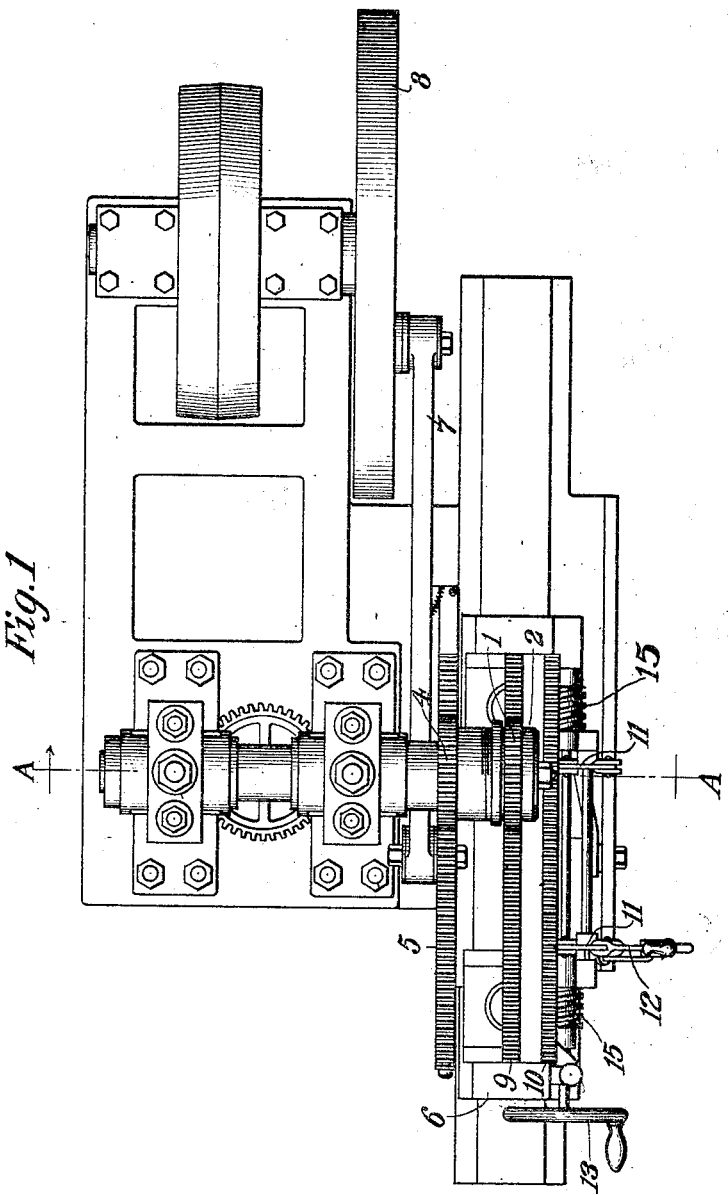

H. N. ANDERSON.
GEAR.
APPLICATION FILED AUG. 28, 1913.

1,199,332.

Patented Sept. 26, 1916.
4 SHEETS—SHEET 1.

Witnesses:
C. H. Kruger
Chas. D. Bronson

Inventor
Harold N. Anderson
By his Attorneys
Kerr, Page, Cooper & Hayward

H. N. ANDERSON.
GEAR.
APPLICATION FILED AUG. 28, 1913.

1,199,332.

Patented Sept. 26, 1916.
4 SHEETS—SHEET 2.

Witnesses:
C. H. Kruger
Chas. D. Brown

Inventor
Harold N. Anderson,
By his Attorneys
Kerr, Page, Cooper & Hayward

H. N. ANDERSON.
GEAR.
APPLICATION FILED AUG. 28, 1913.

1,199,332.

Patented Sept. 26, 1916.
4 SHEETS—SHEET 3.

H. N. ANDERSON.
GEAR.
APPLICATION FILED AUG. 28, 1913.

1,199,332.

Patented Sept. 26, 1916.
4 SHEETS—SHEET 4.

Witnesses:
C. H. Kruger
Chas D Bronson

Inventor
Harold N. Anderson
By his Attorneys
Kerr, Page, Cooper & Hayward

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR.

1,199,332.  Specification of Letters Patent.  Patented Sept. 26, 1916.

Application filed August 28, 1913. Serial No. 787,215.

*To all whom it may concern:*

Be it known that I, HAROLD N. ANDERSON, a citizen of the United States, residing at Cleveland, county of Cuyahoga, and State of Ohio, have invented certain new and useful Improvements in Gears, of which the following is a full, clear, and exact description.

This invention, which constitutes the subject matter of this application, relates to rolled toothed objects, such as gear wheels, racks and the like, and the process of manufacture thereof.

One object of my invention is to provide such articles with gear teeth which shall be stronger, more accurate and more durable than have been heretofore produced, and another object is to provide a simple and economical process of forming said teeth.

In accordance with a preferred embodiment of my invention, I provide rolled gear teeth in which the grain of the metal follows the contour of the teeth, while the metal is compacted to provide teeth of extreme density, strength, durability, and refinement of grain. Furthermore, owing to the fact that the grain of the metal of each tooth is in pyramidal or trussed form, the teeth offer a high resistance to bending or shearing stresses.

In manufacturing the gear teeth of a gear wheel in accordance with my invention I form the toothed periphery of the gear wheel by rolling a blank in a heated state against a toothed die member and concurrently causing a relative movement of approach between the die member and the blank. During the entire tooth rolling operation I maintain synchronous relations between the teeth on the die member and the teeth on the blank, so that the teeth of the die will enter the blank in a radial path from the time the tooth forming operation begins until it is ended. I prefer to maintain the aforesaid synchronous relations between the teeth of the die member and the teeth of the blank by driving the toothed die member and the blank at a fixed speed ratio so that the lineal velocity of the imaginary line on the blank, which, when it has become a finished gear will be known as its pitch line, will be equal to the pitch line velocity of the toothed die member from the time the operation of forming the teeth is begun until it is completed.

As each tooth is rolled the metal is kneaded and worked slowly without injurious shock, which allows the structure of the metal to change gradually and uniformly. This operation of kneading and working the metal not only greatly increases the density of the metal in the teeth but also refines the grain, thereby increasing the strength of the teeth and producing a better surface condition for wear. Furthermore, owing to the fact that the teeth of the die member enter the blank in a radial path the fiber or grain of the metal of the blank is not cut during the rolling operation but follows the serrated contour of the gear, so that the grain of the metal of the finished gear has a trussed or pyramidal form.

Metallurgy and metallography, though ancient sciences, are undergoing rapid development, and new discoveries pertaining to them are constantly being made. In the light of the present knowledge on the subject, however, I will now explain what I believe to be the effect of the die on the metal of the blank.

It is said, and is probably true, that the more metal is worked the more homogeneous and refined it becomes. Therefore, however well the metal of the blank may have been previously worked, it is still further refined by the kneading action of the die, and this refining is effected under the most favorable conditions. That is, the volume of metal acted upon, a volume no greater than the content of one tooth, is so small that it is affected clear through. Moreover, the volume is so small that there can be but little difference between the internal and external temperature. The effect of the die on the blank is elongation of certain portions of the metal. This elongation is approximately parallel to the sides of the tooth, and any seams which may have remained after the previous treatment of the metal composing the blank are elongated and laid approximately parallel to the sides of the tooth, and therefore perpendicular to the strain normally imposed upon the tooth. Moreover, if the heat is sufficient there is more or less elimination of these seams by their sides becoming welded.

The refinement of the metal consists mainly in breaking up the crystals, mixing them more intimately together and breaking up the cleavage planes along which they would yield. This increases the cohesion and adhesion of the crystals, and hence the mechanical strength of the metal, and also increases its specific gravity and hardness. There is also more or less elongation of the crystals in the direction of the elongation of the metal, which, by making the transverse cleavage planes short relative to the longitudinal cleavage planes, increases the tensile strength of the metal in the direction of its elongation. The elongation of the metal is in a general way radial to the axis of the blank and therefore, as above stated, approximately parallel to the sides of the teeth. The normal strain, that is, the working pressure, on the teeth is against their sides, which places the metal of one side in tension and that of the other side in compression. This tension and compression is therefore in the direction in which the tensile strength of the metal has been strengthened by elongation of the crystals. Microscopic examination of portions of a gear made by my process from a normal drop forging discloses the fact that while in the metal not affected by the die the pearlite is gathered together in rather large islands in the matrix of ferrite, in the metal which has been acted upon by the die the islands of pearlite are small, well broken up and very uniformly distributed. The elongation of the crystals referred to is also quite apparent.

From the foregoing it is manifest that the crystalline and fibrous structure are arranged in a sort of parallelism or correlation.

I preferably form the gears from drop forged blanks direct from the hammer, without any machine work having been done on them. They may also be crucible steel castings. These blanks are about the same outside diameter as the pitch diameter of the gears to be made from them, and as the rolling operation displaces the metal and causes it to flow outward to form the parts of the teeth outside of the pitch-line; there is practically no waste of metal, only a slight surplus being required to insure that the spaces between the teeth of the die member shall be entirely filled by the metal of the blank at the end of the rolling operation, and as a result the density, and therefore the strength of the gear at all points is very uniform.

The finished gear is suitable for most industrial purposes without further treatment after the rolling operation, but where extreme accuracy is desired, or any slight irregularity exists, the gear may be "finished" or "ground" in any suitable manner, such as by running it in mesh with another gear, and if desired, by applying an abrasive mixture for a few minutes.

In manufacturing gears by my process the blank is heated to a high temperature and the formation of the teeth is completed while the temperature is above the critical point of the metal. For this reason there are no internal stresses in the metal and the finished gears may be subjected to heat treatment, such as case hardening, with little or no probability that they will become distorted, as cut gears so often do.

By using a blank of fairly high carbon steel, the chilling effect from its contact with the comparatively cool die member during the rolling operation gives the gear a hardened surface condition without any additional hardening or treating operation.

The process of manufacturing gear wheels in accordance with my invention makes it possible to employ high manganese steel for gear wheels, which metal cannot be machined into a gear commercially at the present time.

I prefer to carry out my process with machines of the kind described in my pending U. S. application, Serial No. 643010 in which means are provided to maintain the peripheral pitch line velocity of the blank equal to that of the die.

I will now proceed to describe my invention with reference to the accompanying drawings, in which—

Figure 2:
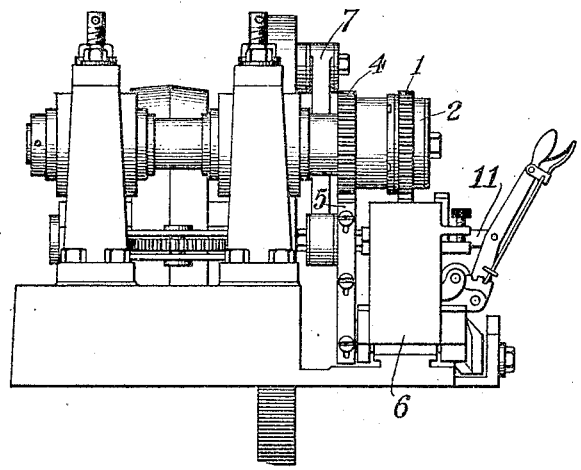
Figure 3:
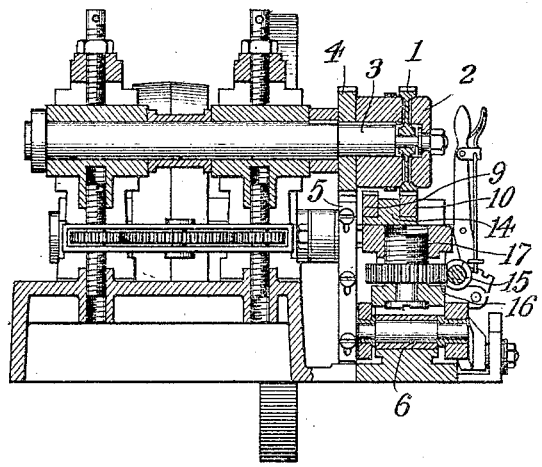
Figure 4:
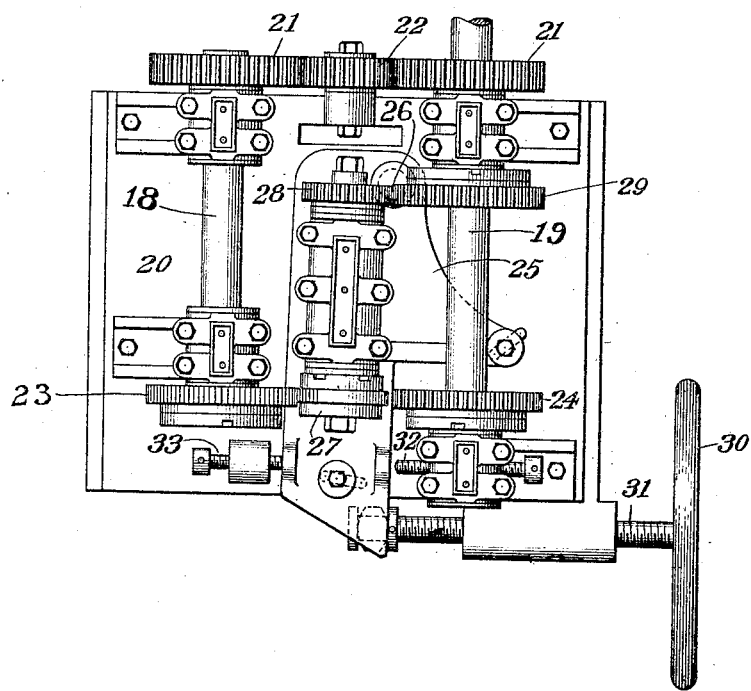
Figure 5:
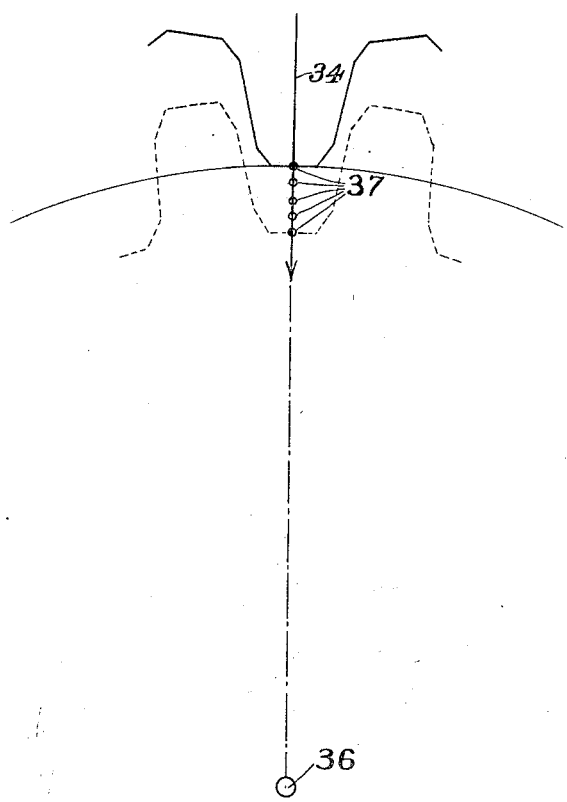
Figure 6:
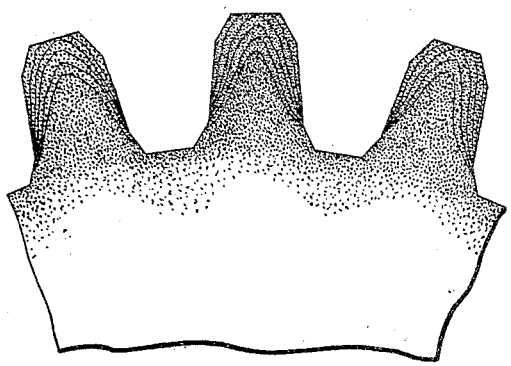

Figure 1 is a plan of a machine for rolling gear wheels in which the die member consists of a rack. Fig. 2 is an end elevation of said machine, Fig. 3 is a section along the line A A of Fig. 1. Fig 4 is a plan of a machine having a circular die member. Figs. 5 and 6 are diagrams illustrating the tooth forming operation.

The machines shown in the drawings are fully described and illustrated in my aforesaid co-pending U. S. application, Serial No. 643,010, filed August 8, 1911.

Referring to Figs. 1, 2, and 3, the blank 1 is carried by a blank holder 2 mounted on a shaft 3 which also carries a gear 4. This gear enmeshes with a driving rack 5 carried by a carriage 6, which carriage is reciprocated by the pitman 7 and fly wheel 8 driven by any suitable driving means. Mounted on this carriage 6 are two racks 9, 10, which can be moved transversely relative to the driving rack 5 by links 11 controlled by a lever 12 as shown, so that the "breaking-down" die rack 9 and the "finishing" die rack 10 can operate upon the blank 1 in turn. A relative movement of approach between the die racks and the blank during the rolling operation is effected by rotating the hand wheel 13, thereby moving the die rack support 14 upwardly be means of the worms 15, worm wheels 16 and screw spindles 17.

In operation, the reciprocating movement of the carriage 6 is imparted to the driving rack 5 and the die racks 9 and 10. The gear 4 meshing with, is rotated by, the rack 5, thereby rotating the shaft 3 and blank 1. By operating the lever 12 either the breaking-down rack or the finishing rack is brought into operation, and the teeth thereof are caused to sink increasingly deeper into the blank by suitably operating the hand wheel 13 which controls the lifting of the rack support 14. Since the gear 4 and the blank rotate as a unit a circle drawn on the blank of the same diameter as the pitch circle of the gear 4 would necessarily have the same lineal velocity as the said pitch circle from start to finish of the tooth forming operation; therefore, since the depth of enmeshment of the gear and rack 5 is constant, and the die racks cannot move longitudinally relative to the rack 5, it is clear that the lineal velocity of the blank is equal to that of the racks and therefore to that of their pitch lines.

Referring to the machine shown in Fig. 4, shafts 18 and 19 are rotatably mounted in bearings carried by a bed plate 20, each shaft having rigidly secured thereto a gear 21 which are connected together by an intermediate gear 22. Shaft 18 carries a toothed breaking-down die roller 23, and shaft 19 carries a toothed finished roller 24. A plate 25 lies upon the bed plate 20 and is pivotally secured thereto at 26. A shaft is journaled in a bearing carried by plate 25, and on one end thereof a blank holder 27 is mounted. A gear 28 is rigidly secured to the other end of the shaft and is enmeshed with a gear 29 rigidly secured to shaft 19. The axis of the pivot 26 is in line with the point where the pitch circles of gears 28 and 29 touch, and also in line with one edge of gear 28. Obviously, the plate 25 can be swung on the pivot 26 without varying the distance between the axis of gear 28 and the axis of the pivot 26; therefore, the depth of enmeshment of gears 28 and 29 at the side lying upon the axis of the pivot does not vary when the plate 25 moves, from which it follows that the speed ratio between the blank and the finishing roller is fixed whether the blank is enmeshed with it, with the breaking-down roller, or is anywhere between these extremes. Furthermore, since the shafts 18 and 19 are geared together, the speed ratio between the blank and the breaking-down roller is also fixed. As will be readily understood, the plate 25 is moved to and fro between the shafts by the hand wheel 30, which operates the screw 31. Adjustable stops 32 and 33 limit the movement of the plate 25.

When in operation the machine is driven by means which is not shown, acting upon shaft 19. A blank is placed in the machine, and by means of the hand wheel it is pressed against the breaking-down roller; having received sufficient of that treatment it is brought over into engagement with the finishing roller. From what has already been said, it is obvious that the lineal velocity of the pitch line of the blank is the same as that of the roller during the entire tooth forming operation.

The action of the teeth of the die member upon the metal of the blank will now be explained in detail, with reference to Figs. 5 and 6. The position of a tooth of the die member relative to the blank at the commencement of the tooth forming operation is illustrated in full lines in Fig. 5, and the arrow 34 is a line which if extended upwardly would pass through the center of the die member (assuming it is in this case circular). Once during each revolution of the die member this arrow points directly at the center 36 of the blank. If, as the tooth is caused to sink deeper and deeper into the metal of the blank, a succession of dots 37 could be made on the blank, each dot being made opposite the point where the line 34 crosses the end of the tooth and when the arrow points at the center 36, a line drawn through these dots would be straight and radial to the center of the blank. The foregoing would be equally true were the die member a rack; in that case the line 34 would be perpendicular to the pitch-line of the rack. That the tooth of the die member does enter the blank along this radial path is due to the synchronous relations maintained between the die members and the blank; i, e., to the fact that the pitch line velocities of the die member and blank are equal. As the tooth enters the metal of the blank it gradually displaces the metal without cutting the grain, so that at the end of the tooth-forming operation the fiber of the metal in the tooth and at the bottom of the tooth will have taken substantially the form indicated in Fig. 6.

Fig. 6 shows a segment of a toothed gear made in accordance with the invention, the fine irregular lines illustrating the manner in which the grain of the metal follows the contour of the teeth, and the stippled portion of the surface indicating the increased density of the metal due to the process of forming the teeth. It will be realized from this that by means of my improved process, the grain of the metal is worked into a trussed or pyramidal formation, the metal of the teeth being also compacted to give a denser and more refined grain. Importance is attached to the teeth of the die member entering the blank in a radial path, because if the teeth enter the metal of the blank in curvilinear path they will distort the metal of the blank so that the teeth of the finished gear will not be a homogenous mass with the body and therefore will not present the characteristics of strength and durability which are present in gears formed according to my improved process.

As has been stated one object of this invention is to produce more accurate gears than have been heretofore produced. That this result is attained will now be shown, and in order that the matter may be thoroughly understood a brief consideration of some of the requirements of toothed gears is necessary. Suppose two cylinders be rotatably mounted with their axes parallel and their surfaces touching. If one of the cylinders be rotated, adhesion of its surface to the surface of the other cylinder will make that rotate also. Assuming there is no slipping the surfaces of the cylinders will evidently move through the same distance in a given time. This surface speed has been referred to above as "lineal velocity". Now let the surfaces of the cylinders represent pitch-circles on mating gears and the problem is to provide teeth of such shape as will keep the relative motion of the gears the same as that of the cylinders rotating in contact without slipping. In other words the teeth must coact in such manner that the lineal velocity of the pitch-circles will be equal at all times.

By the application of geometry it can be shown that by rolling together two circles, or a circle and a line, without slipping, a point which is fixed with reference to one of the circles will inscribe a line having a form and position with reference to the other circle which is conjugate to the path traversed by the point. Development of this principle has demonstrated that if a wheel having a projection at one point on its periphery be rolled against a second wheel, of plastic material, a depression will be formed in the second wheel which is conjugate to the projection. From this it is evident that a toothed gear wheel rolled against the periphery of a wheel of plastic material will form a succession of depressions whose sides are conjugate to the teeth of the gear, and, obviously, the projections between the spaces thus formed will have the form of gear teeth. This method of forming gear teeth is known as "generating" and is distinguished from other methods in that the teeth are formed by virtue of the principle of operation of the machine instead of being simply copies of previously formed templets. In other words the forming tooth is given such a motion relative to the blank as will cause it to correctly shape the teeth on the blank, though the shape of the forming tooth is not that of the spaces formed in the blank. Reverting to the requirements of toothed gears it is clear that if proper relative motion be imparted to the blank and tooth forming gear, that is, if the circle which will eventually be the pitch circle of the blank be given such movement relative to the pitch circle of the gear as the surface of one cylinder would have with reference to the surface of another cylinder against which it is rolled without slipping, the teeth formed on the blank would be capable of coacting with those on the forming gear so that if one were arranged to drive the other the lineal velocity of their pitch circles would be equal.

Obviously, if the teeth generated are to have a form which will produce equal pitch line velocity when two of them are rotated together, equal pitch line velocity must be maintained while the teeth are being generated. In United States Patent No. 1,001,799, issued to me August 29, 1911, I described and claimed a machine for rolling (generating) gear teeth while the blank and die-roll were driven at substantially equal velocities,—the velocities being near enough equal for practical purposes. In my copending application, Serial Number 643,010 above referred to, I have described and claimed machines in which the velocity ratio is quite fixed. By the use of either of these machines, therefore, I can generate gear teeth having the correct contour.

Mention has been made above of the surface condition of teeth formed by my process: Not only is the metal dense, but the surfaces of the teeth are practically free from the oxid, commonly called scale, always found on forgings. This condition is very desirable because it obviates the necessity of grinding or otherwise treating the teeth to remove scale, and it facilitates penetration of the carbon in case hardening. The die teeth have a percutient as well as a compressive effect on the metal of the blank, which is very beneficial both to the tooth surfaces and structure. The effect is analogous to that of the hammer in ordinary forging operations. The teeth are in fact forged. A further advantage resides in the fact that the teeth of the dies remain in contact with the hot blank so short a time that they absorb very little heat—too little to injure them. Moreover, the length of time the teeth are out of contact with the hot metal is so great compared with the length of time it is in contact that ample opportunity is afforded for the teeth to cool. As there is practically no limit to the number of teeth the die may have; i. e., the rack may be as long, or the rotary die as large in diameter, as is necessary to keep them cool, it is clear that conservation of the die is not a problem.

It will be obvious to those skilled in the art that changes may be made without departing from the scope of my claims.

What I claim is:

1. As an article of manufacture, a gear whose body is composed of metal having a given strength and whose teeth are composed of metal of increased strength.

2. As an article of manufacture, a gear whose body is composed of metal of given refinement, and whose teeth are composed of metal of super-refinement.

3. As an article of manufacture, a gear whose body is composed of metal of given density and whose teeth are composed of metal of increased density.

4. As an article of manufacture, a gear whose body is composed of metal of given density and whose teeth are composed of metal of increased density, the metal in said gear being substantially free from stresses which would tend to distort the gear if subjected to heat treatment.

5. As an article of manufacture, a gear having teeth in which the metallic crystals are elongated and lie in approximate parallelism to the working faces of the teeth.

6. As an article of manufacture, a gear in which the metallic crystals are elongated and wherein said crystals and the fibers of the metal in the teeth lie in approximate parallelism to the working faces of the teeth.

7. As an article of manufacture, a gear in whose teeth the crystals are more broken up and in which there is greater adhesion and cohesion of the crystals than in the metal composing the body of the gear, and in which the fibrous and crystalline elements of the metal are so correlated as to afford the greatest mechanical resistance to strains in the direction of the normal working pressure on the teeth.

8. As an article of manufacture, a gear wherein the cleavage planes along which the metallic crystals would separate under strain are relatively long in the direction perpendicular to the normal strain on the teeth.

9. As an article of manufacture, a gear in which the metal composing the teeth is more dense than the metal in the body and wherein the fibrous structure of the teeth has a form approximately like that of the teeth.

10. As an article of manufacture, a gear wherein the carbon content is the same in the body as in the teeth, but wherein the metal composing the teeth is harder and stronger than the metal in the body of the gear.

11. As an article of manufacture, a forged gear wherein the carbon content is the same in the body as in the teeth, but wherein the metal composing the teeth is harder and stronger than the metal in the body of the gear.

12. As an article of manufacture, a gear having forged teeth possessing the compact, homogeneous and refined structure characteristic of good forgings, whose surfaces are substantially free from forging scale and from the pits and other irregularities found on the surfaces of forgings when the scale is removed.

13. As an article of manufacture, a gear composed of mechanically refined metal, the metal in the teeth being super-mechanically-refined.

14. As an article of manufacture, a gear having teeth constructed on an imaginary pitch cylinder, the body of said gear being composed of metal of given density and whose teeth are composed of metal of increased density, the metal in said gear being substantially free from stresses which would tend to distort the gear if subjected to heat treatment.

15. As an article of manufacture, a gear having teeth constructed on an imaginary pitch cylinder, whose body is composed of metal having a given strength and whose teeth are composed of metal of increased strength.

16. As an article of manufacture, a gear having teeth constructed on an imaginary pitch-cylinder, the metal composing the body of the gear being of given density while the metal in the teeth is of increased density.

17. As an article of manufacture, a gear having teeth constructed on an imaginary pitch cylinder, composed of metal of given refinement while the teeth are composed of metal of super-refinement.

18. As an article of manufacture, a gear having teeth constructed on an imaginary pitch-cylinder, the metal in the teeth being more refined than the metal in the body, the structural elements of the metal in the teeth being arranged in approximate parallelism to the working faces of the teeth.

19. As an article of manufacture, a gear having teeth constructed on an imaginary pitch-cylinder, the metal in the teeth being harder than the metal in the blank, though of equal carbon content.

20. As an article of manufacture, a forged gear having teeth constructed on an imaginary pitch-cylinder, the metal in the teeth being more refined than the metal in the body of the gear.

In testimony whereof I affix my signature in the presence of two subscribing witnesses.

HAROLD N. ANDERSON.

Witnesses:
WM. BOHLEBER,
F. K. FASSETT.